United States Patent [19]

Stevenson et al.

[11] Patent Number: 5,309,943
[45] Date of Patent: May 10, 1994

[54] MICRO-VALVE AND METHOD OF MANUFACTURING

[75] Inventors: Paul E. Stevenson, Livonia; Charles F. Eagen, Ann Arbor; Carlton S. Avant, Southfield, all of Mich.

[73] Assignee: Ford Motor Company, Dearborn, Mich.

[21] Appl. No.: 986,313

[22] Filed: Dec. 7, 1992

[51] Int. Cl.⁵ .................. F16K 31/02; F16K 1/44
[52] U.S. Cl. ................... 137/625.5; 251/368; 156/647
[58] Field of Search .......... 251/331, 129.17, 129.06; 156/647

[56] References Cited

U.S. PATENT DOCUMENTS

| | | |
|---|---|---|
| 4,581,624 | 4/1986 | O'Connor . |
| 4,647,013 | 3/1987 | Giachino et al. . |
| 4,657,621 | 4/1987 | Johnson et al. . |
| 4,670,092 | 6/1987 | Motamedi . |
| 4,756,508 | 7/1988 | Giachino et al. . |
| 4,768,751 | 9/1988 | Giachino et al. . |
| 4,826,131 | 5/1989 | Mikkor . |
| 4,869,282 | 9/1989 | Sittler et al. . |
| 4,966,646 | 10/1990 | Zdeblick . |
| 5,029,805 | 7/1991 | Albarda et al. . |
| 5,065,978 | 11/1991 | Albarda et al. . |
| 5,082,242 | 1/1992 | Bonne et al. . |
| 5,161,774 | 11/1992 | Engelsdorf et al. ....... 251/129.06 X |

OTHER PUBLICATIONS

"Variable-Flow Micro-Valve Structure Fabricated With Silicon Fusion Bonding", Farzad Pourahmadi, et al, NovaSensor, Fremont, Calif., 1990 IEEE, pp. 78-81.
"Electrically Activated, Normally-Closed Diaphragm Valves", Hal Jerman, IC Sensors, Milpitas, Calif. 1991 IEEE, pp. 1045-1048.
"Smallest Dead Volume Microvalves For Integrated Chemical Analyzing Systems", Shuichi Shoji, et al, Dept. of Precision Eng., Tohoku University, 1991 IEEE, pp. 1052-1055.

Primary Examiner—Arnold Rosenthal
Attorney, Agent, or Firm—Roger L. May; Joseph W. Malleck

[57] ABSTRACT

Described is a microvalve comprised of a movable spool and/or seat comprising a silicious spool having three planes, e.g. three planes aligned with all of the spool's planes, and a silicious seat conforming to the spool's planes. The spool and/or the seat may move to open or close the valve.

1 Claim, 5 Drawing Sheets

MICRO-VALVE AND METHOD OF MANUFACTURING

TECHNICAL FIELD

The present application is concerned with micro-valves having a movable spool and seat comprised of silicious material.

BACKGROUND ART

Silicious valves are fairly well known, and numerous publications exist dealing with their structure and various manufacturing techniques. For example, U.S. Pat. No. 5,082,242 teaches an electronic micro-valve which has an integral structure made on one piece of silicon and is a flow through valve with an inlet and an outlet on opposite sides of the silicon wafer. The aperture for flow through the silicon wafer is opened and closed by a movable closure member that merely covers the aperture for flow.

In the article "Electrically Activated, Normally Closed Diaphragm Valves" by H. Jerman (91CH2817-5/91 IEEE), there is a disclosure as to electrically activated, normally closed diaphragm valves that have been fabricated using heated bimetallic diaphragms to provide the operating force. FIG. 1 in the document discloses a boss which completely covers the valve seat, thereby preventing flow to the outlet.

In the article entitled "Smallest Dead Volume Microvalves For Integrated Chemical Analyzing Systems" by S. Shoji, B. Van der Schoot, N. de Rooij and M. Esashi (91CH2817-5/91 IEEE), there is a discussion with respect to normally open and normally closed microvalves and a three-way microvalve. The drawings depict a ridge in a silicious substrate which contacts a polymer membrane, thereby controlling flow through the inlet and outlet.

Numerous other references pertain to micro machine valves and are listed as follows. U.S. Pat. Nos. 4,581,624; 4,647,013; 4,657,621; 4,670,092; 4,756,508; 4,768,751; 4,826,131; 4,869,282; 4,966,646; 5,029,805; 5,065,978; 5,082,242; and the article entitled "Variable-Flow Micro-Valve Structure Fabricated With Silicon Fusion Bonding" by F. Pourahmadi, L. Christel, K. Peterson, J. Mallon and J. Bryzek (CH2783-9/90 IEEE).

It is an object of the present invention to obtain silicious micro-valves which have a movable spool and/or valve seat which permits a complete alignment with the 111 planes of the spool and the conforming seat.

It is another object of the present invention to obtain a conformed spool and valve seat which (i) permits sharp edge orifice controls to thereby obtain improved flow viscosity effects and (ii) has improved sensitivity of the valve and thereby improved valve performance.

SUMMARY OF THE INVENTION

The present invention is concerned with a microvalve comprised of a movable spool and/or seat comprising a silicious spool having three planes, and aligned with all of the spool's planes, a silicious seat conforming to the spool's planes, wherein the spool and/or the seat may move to open or close the valve.

Also described is a method of manufacturing a silicious micro-valve comprising the steps of:

a. providing a first silicious substrate, b. removing a portion of the first substrate to reveal the three planes of the substrate, the three planes forming the valve seat, c. growing a spool coliforming to the three planes of the first substrate, d. assembling the two substrates formed using steps (a) through (c) to form a micro-valve.

DESCRIPTION OF PREFERRED EMBODIMENTS

Figure 1:
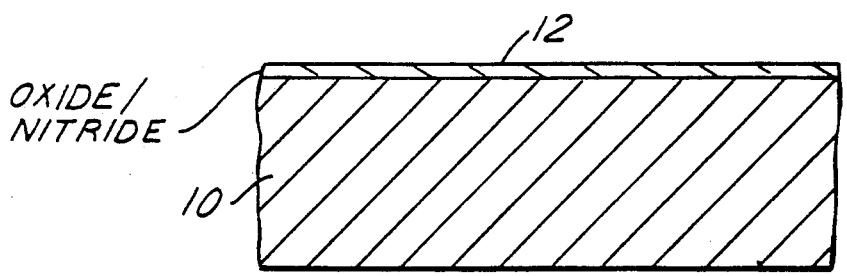
FIGS. 1–23 are cross-sectional views of a silicious substrate with different materials applied and removed in the preparation of a portion of a microvalve.
Figure 2:
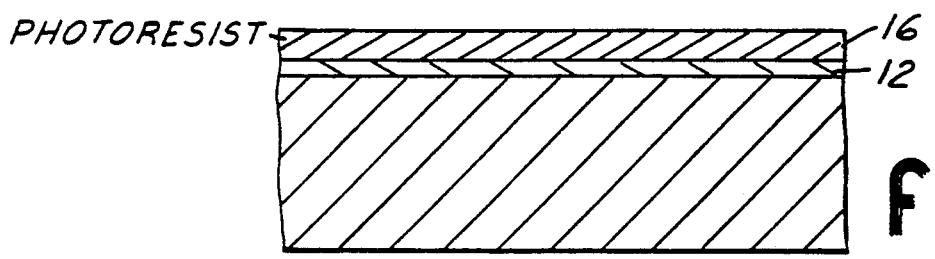
Figure 3:
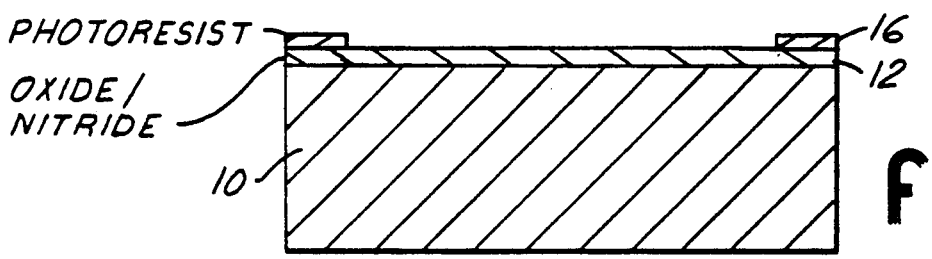
Figure 4:
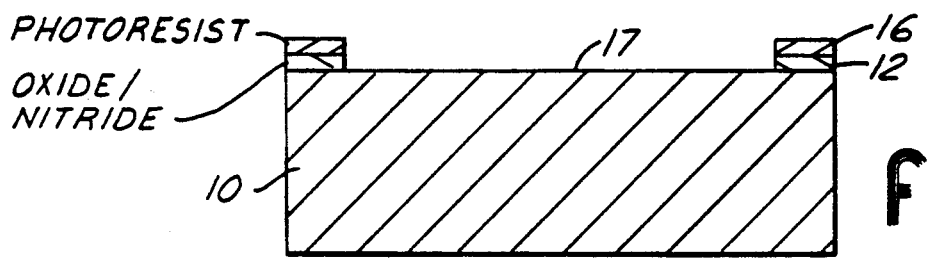

The present invention is concerned with a silicious microvalve and the manufacture of same. In the drawings, a silicious substrate 10 has a silicious nitride or oxide coating 12 applied to the substrate. Prior to the wafer having applied the silicious nitride thereto, the silicious wafer is treated with five parts of sulfuric acid with one part of peroxide and is heated at 100° C. This is a cleaning technique and is generally considered a pre-treatment prior to the application of the silicon nitride. The thickness generally ranges from about 500 to 1000 angstroms using commercially available techniques. In general, this is a low pressure chemical vapor deposition (LPCVD). The reaction conditions generally are 800° C. at 300 millitorr. Reagents are generally dichlorosilane and ammonia. Thereafter, a photoresist 16 is applied to the layer 12 using standard integrated circuit photolithography techniques. A typical technique is to spin coat Shipley product 1470 positive photoresist onto the silicious substrate. The conditions are about 5000 rpm with a coating thickness of 1.2 microns (see FIG. 2). The resist is patterned by exposing selected regions to UV light using commercially available equipment (chrome masks and mask aligners). After exposing the resist to UV light it is developed in a commercially available developer, such as Hoechst Celanese MF 312. The developer removes the resist that was exposed to UV light. The cross-section is shown in FIG. 3. Next the oxide/nitride layer is etched using the patterned resist as a mask. First the silicon nitride is etched, typically in a plasma etch system. A commercially available etcher, such as a Tegal 903e (Tegal, Inc. of Arizona), would use $SF_6$ at about 300 mtorr with a 100 watt RF field applied to form a plasma. The sulfur hexafluoride plasma etches silicon nitride. Once the nitride is etched the silicon dioxide can be removed either using a plasma, or a wet etch in a dilute HF solution. commercially available oxide etches will typically contain ammonium fluoride as a buffering agent. FIG. 4 shows a cross-section of the structure after the oxide and nitride have been etched, exposing silicious surface 17.

Figure 5:
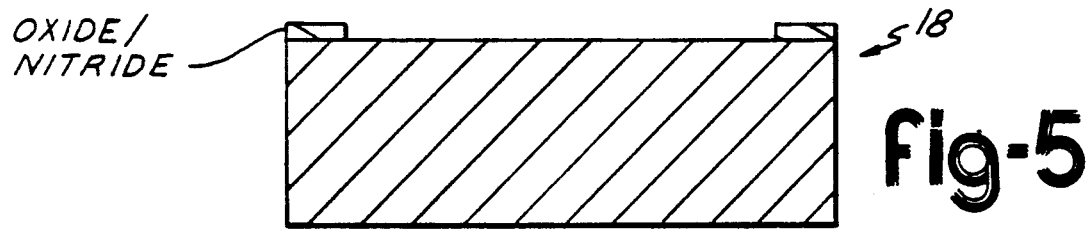

The photoresist can now be removed from the wafer. An oxygen plasma can be used. Commercially available systems include Branson International Plasma Corp. of California and Technics Plasma GmbH of Muenchen, Germany, or a wet strip of five parts of sulfuric acid with one part of hydrogen peroxide and heated to 100° C. FIG. 5 shows the cross-section after resist removal.

Figure 6:
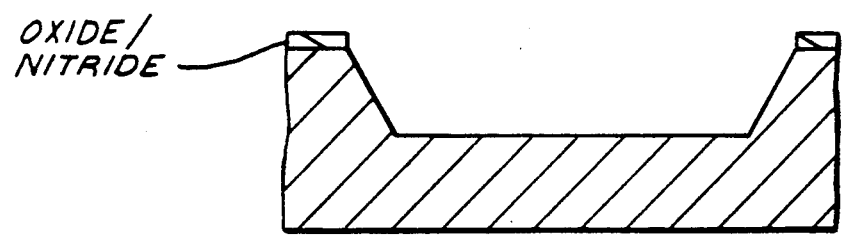

The next step is to etch the material of FIG. 5 to obtain that shown in FIG. 6 with an anisotropic etchant such as potassium hydroxide or EDP (ethylene diamine and pyrocatechol in the presence of water).

Figure 7:
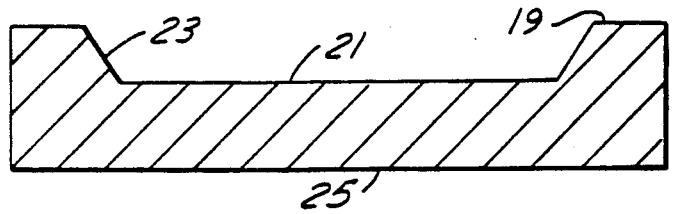

The etching that takes place as is shown in FIG. 6 is to a depth of about 5 to 30 microns so that the unetched portion identified as 18 has a silicon nitride or oxide layer. After the anisotropic etching is complete the oxide/nitride layer is removed from the wafer. This is done by immersing the wafer in a 1:1 mix of HF and deionized water (DI). The structure is shown in cross-section in FIG. 7 showing silicious surfaces 19, 21, 23 and 25.

Figure 8:
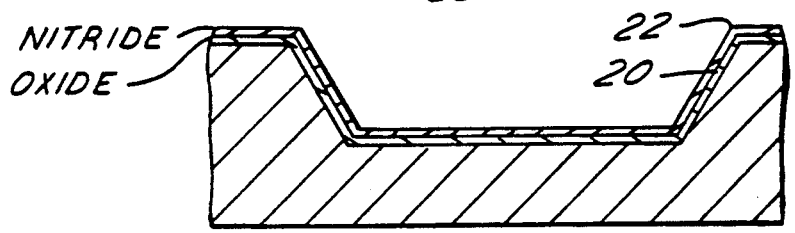

In the next step, FIG. 8, there is the application of additional silicon oxide 20 which is grown over the entire wafer surface. Silicon nitride 22 is then applied on top of silicon oxide. The silicon nitride is deposited by LPCVD.

Figure 9:
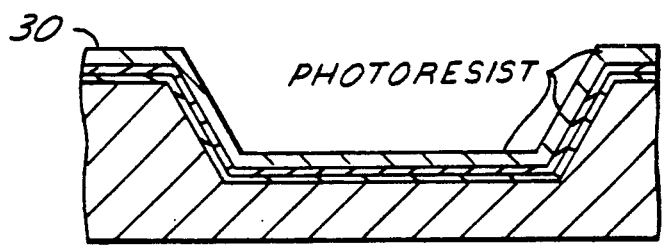
Figure 10:
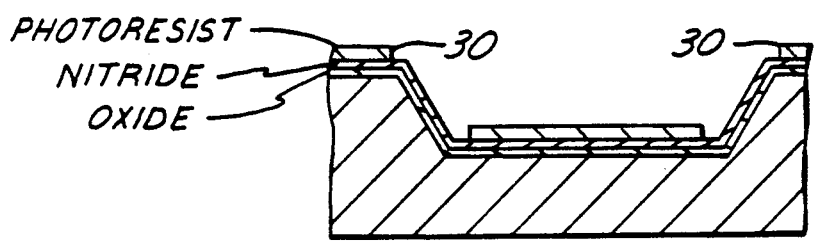

The next step as is shown in FIG. 9 is the application of a photoresist shown as reference numeral 30. The resist is patterned using photo masks and UV light as described earlier. After developing the resist the cross-section will look like FIG. 10.

After the developing of the resist, the nitride material will be etched utilizing a plasma etching system as described earlier.

Figure 11:
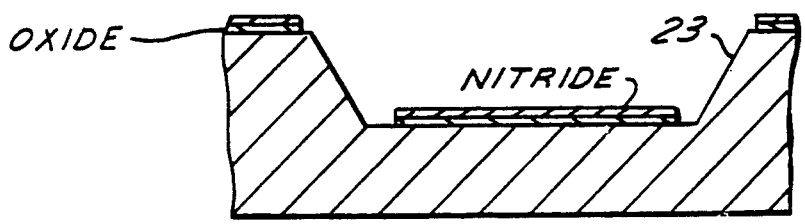
Figure 12:
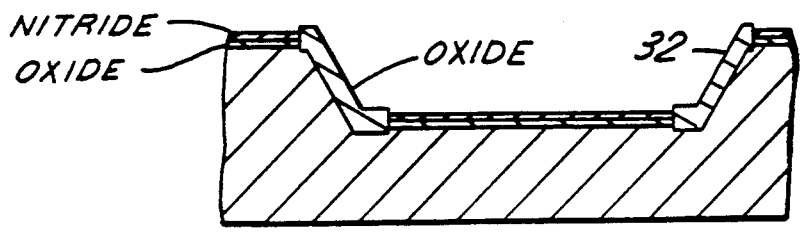

Thereafter, the resist is cleaned off. The wafer is shown in FIG. 11 uncovering surface 23. The wafer is now placed into a diffusion furnace (commercial manufacturers include ASM International of Phoenix, Ariz.; and BTU Engineering Corp., Bruce Systems Division of N. Billerica, Mass.) and heated to about 1000° C. in the presence of oxygen and steam. The oxygen and steam cause the silicon not covered with silicon nitride to convert to silicon dioxide. The conversion, or growth, of oxide slows down as the thickness of the oxide increases. FIG. 12 shows the cross-section after one or two micrometers of oxide 32 have been grown. (This technique of selectively growing oxide using a layer of silicon nitride as a mask is commonly referred to as LOCOS, or LOCal Oxidation of Silicon).

Figure 13:
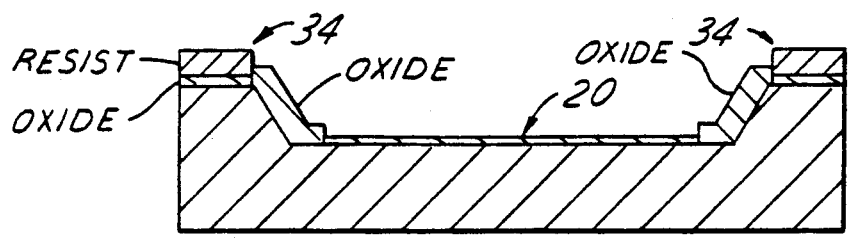
Figure 14:
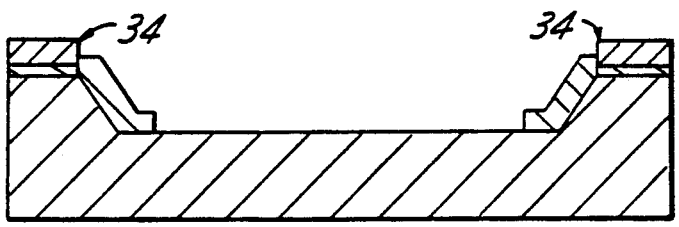
Figure 15:
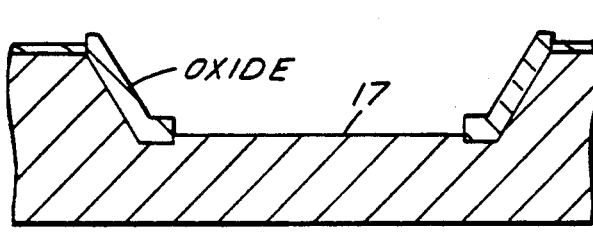

The nitride material is then removed such as by hot phosphoric acid. As shown in FIG. 13, photoresist 34 is applied to the wafer and patterned. The oxide 20 at the bottom of the pit is then etched away using a plasma or a wet etch as described earlier. FIG. 14 shows the device cross-section after oxide etch revealing surface 21. Note: the sidewall oxide will also etch, but since it is so much thicker than the oxide on the bottom of the pit any loss in thickness is negligible. The resist is then cleaned off of the wafer, resulting in a device cross-section as shown in FIG. 15.

Figure 16:
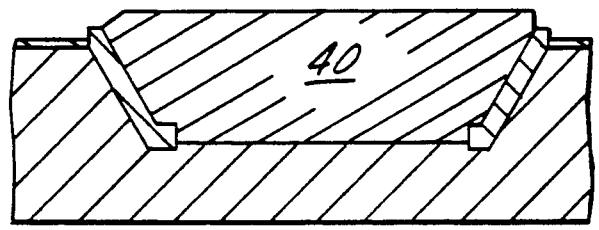

Thereafter, the substrate is cleaned and is subjected to an epi reactor, that is, epitaxial growth occurs by depositing a silicon layer onto the silicon exposed at the bottom of the etch pit. This is applied by CVD (Chemical Vapor Deposition) such as 1100° Centigrade and atmospheric pressure in the presence of dichlorosilane and hydrogen. Additionally, one may use diborane, phosphine or arsine to control the conductivity of the layer. The silicon layer is identified by reference numeral 40. The layer takes on the characteristics of the layer below. The layers are virtually indistinguishable except for the electrical properties of the respective layers (see FIG. 16).

Figure 17:
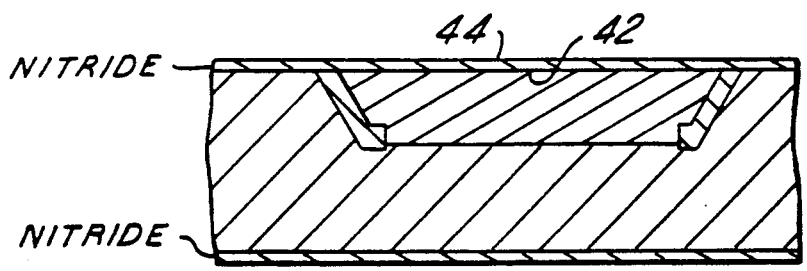
Figure 18:
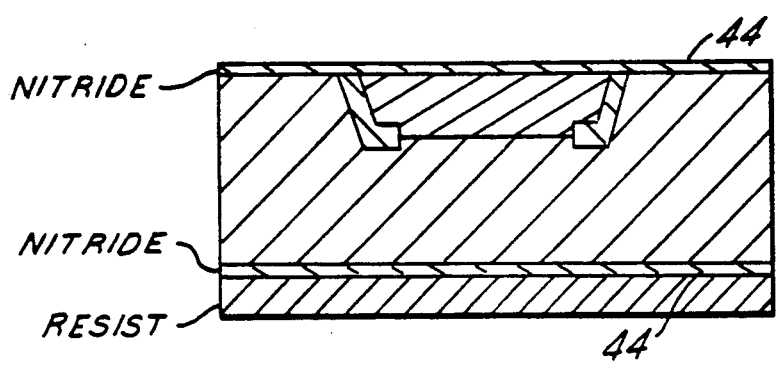
Figure 19:
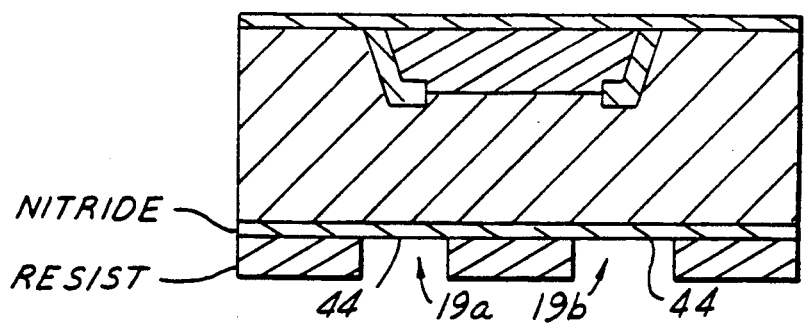
Figure 20:
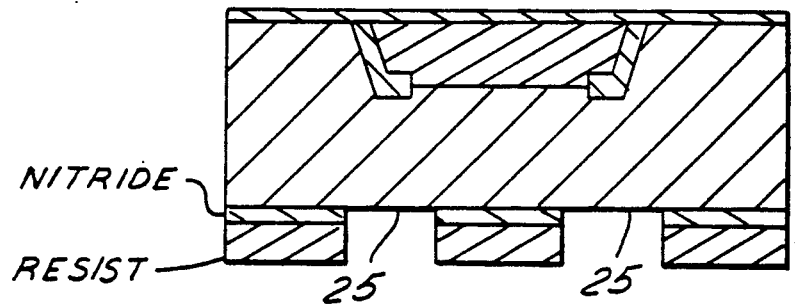
Figure 21:
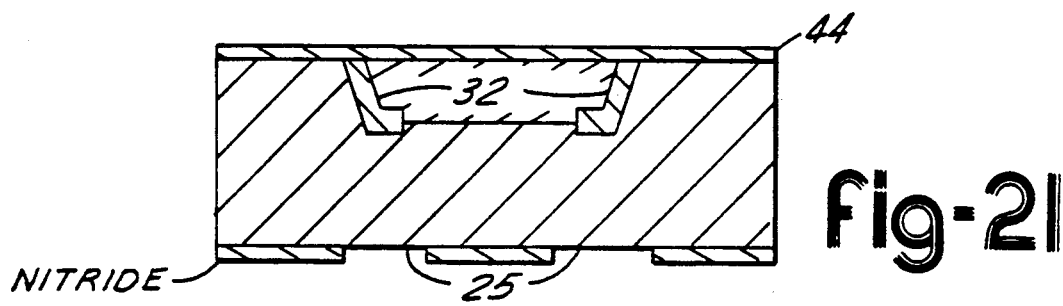
Figure 22:
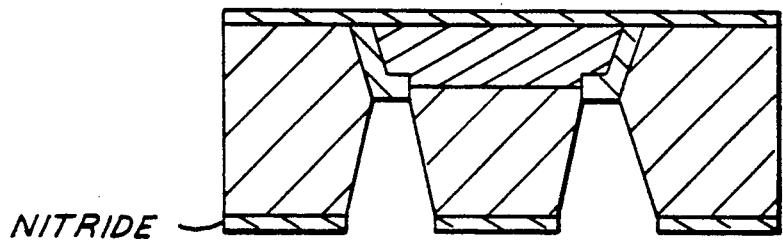
Figure 23:
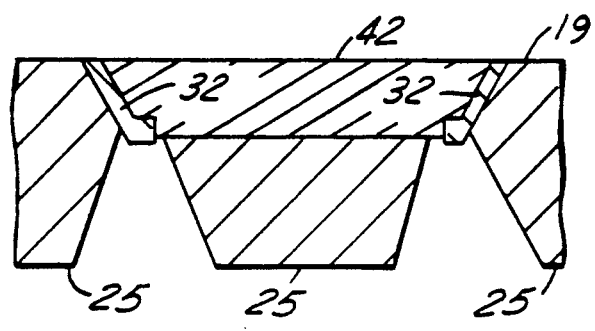

Thereafter, as is shown in FIG. 17, the wafer is ground and polished and sized to the extent shown in FIG. 17 where the layer 40 has been reduced to surface 42. Silicon nitride 44 is applied to the wafer. Photoresist is applied to the wafer backside as is shown in FIG. 18. The resist is patterned as described before resulting in the cross-section shown in FIG. 19 revealing nitride layer 44. The resist pattern is aligned to the machined regions of the wafer by use of a two side aligner. One manufacturer of two side aligners is Karl suss America of Waterbury Center, Vt. The object is to align openings 19a and 19b with machined segments 32 and 42. The nitride on the backside is then etched as described earlier resulting in the cross-section shown in FIG. 20. The resist is then stripped from the wafer as shown in FIG. 21. The silicon is then etched in one of the anisotropic etchants mentioned earlier until the oxide 32 formed on the sidewalls described earlier is revealed, as shown in cross-section in FIG. 22. The nitride is now stripped from the wafer giving the cross-section shown in FIG. 23, revealing surfaces 19, 25 and 42.

Figure 24:
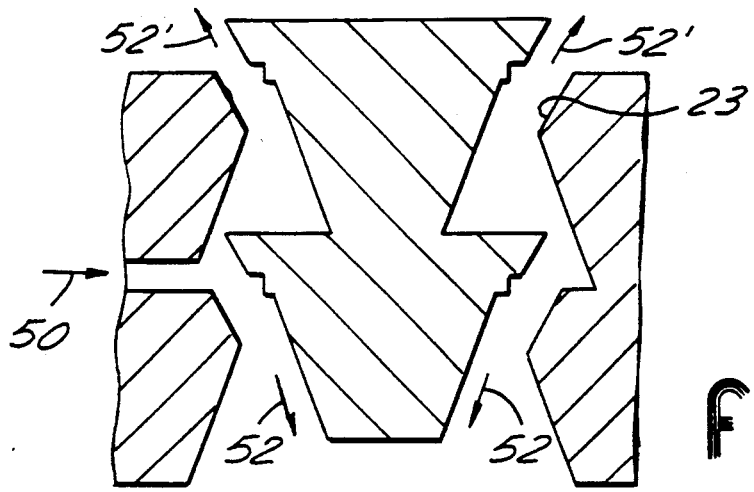
FIG. 24 is a cross-section of an assembled open microvalve.

Two sections resulting from the process described above, namely that shown in FIG. 23, are assembled together as shown in FIG. 24. The materials are assembled by fusion bonding. A typical fusion bonding cycle consists of cleaning the wafers in 5:1 $H_2SO_4:H_2O_2$, rinsing thoroughly in deionized water, drying in heated nitrogen, aligning and pressing the wafers together, then heat them to approximately 1000° Centigrade for 12 hours. The spools are released from the valve seats by immersing in an etching mix of hydrofluoric acid and water, which dissolves the oxide 32 grown on the etch pit sidewalls.

Figure 25:
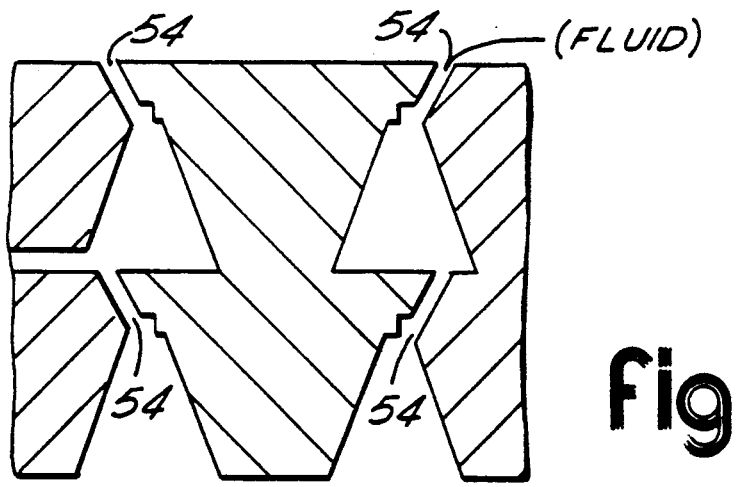
FIG. 25 is a cross-section of an assembled closed microvalve.

FIG. 24 shows the two layers which permit fluid in a final assembly having valve fluid inlet at 50. The inlet 50 is formed during previous processing steps of etching, application of photoresist, and the like in known fashion, even though it has not been shown in the drawings. Fluid outlet at 52 and 52' are formed by dissolution of oxide 32, revealing surface 23. The closed valve is shown in FIG. 25. Due to the size of the microvalve, fluid 54 may be present; but there is no flow because of the construction of the valve surfaces.

A preferred apparatus in which the above-identified valve may be utilized is described in U.S. application Ser. No. 765,613, filed Sep. 25, 1991, entitled "Integral Antilock Brake/Traction Control System" (Ford Motor Co. Invention Disclosure No. 92-202), hereby incorporated by reference.

That apparatus provides an electro-hydro-mechanical integrated anti-lock brake and traction control assembly wherein a linear motor acts on a pressure control valve to provide brake pressure proportional to the voltage signal supplied to the motor. The mode of operation, either anti-lock brake system control or traction control, is selected by simply changing the polarity on the linear motor.

In accordance with one aspect of that apparatus, an integral anti-lock brake and traction control system for a vehicle is provided which includes a pressure control valve including a first pressure feedback valve associated with a braking control system and a second pressure feedback valve associated with a traction control system. In a first mode, means responsive to a control voltage, such as a liner motor, are provided which activate the first pressure feedback valve to regulate brake pressure in the braking control system proportionally to the control voltage which is supplied. In a second mode, the means responsive to the control voltage activate the second pressure feedback valve to control vehicle traction in the traction control system. The modes are selected by simply changing the polarity of the control voltage signal. The valve of this invention is the pressure feedback valve of the invention entitled "Integral Anti-Lock Brake/Traction Control System" described above.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

For example, an alternative to the formation of silicon layer 40, one can dope it with boron and/or germanium such as adding diborane and/or germane gas and incorporate it/them into the solid. The advantage is in its/their removal as in FIG. 23; there is more precise control to obtaining the substrate.

We claim:

1. A microvalve comprised of a movable spool and/or seat comprising:
    a silicious spool having three planes, and aligned with all of the spool's planes, a silicious seat conforming to the spool's planes,
    wherein the spool and/or the seat may move to open or close the valve wherein the spool planes are 111 planes.

* * * * *